US006314360B1

(12) United States Patent
Becker

(10) Patent No.: US 6,314,360 B1
(45) Date of Patent: *Nov. 6, 2001

(54) PROCESS AND APPARATUS FOR TRANSMITTING ROUTE INFORMATION AND ANALYZING A TRAFFIC NETWORK IN A VEHICULAR NAVIGATION SYSTEM

(75) Inventor: Markus Becker, Essen (DE)

(73) Assignee: Mannesmann AG, Düsseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,491

(22) Filed: Sep. 11, 1998

(30) Foreign Application Priority Data

Sep. 12, 1997 (DE) .............................................. 197 41 116

(51) Int. Cl.$^{7}$ ............................ G06F 17/00; G06F 19/00

(52) U.S. Cl. .................................. 701/117; 701/200-215; 340/988; 340/989; 340/990; 340/991; 340/993; 340/995; 340/996; 364/424; 364/449; 364/449.7

(58) Field of Search ............................ 701/117, 200–215; 340/990, 991, 993, 995, 996, 989, 988; 364/449, 424, 449.7; 379/58, 63

(56) References Cited

U.S. PATENT DOCUMENTS

| | | | | |
|---|---|---|---|---|
| 5,845,227 | * | 12/1998 | Peterson | 701/209 |
| 5,893,081 | * | 4/1999 | Poppen | 705/400 |
| 5,916,299 | * | 6/1999 | Poppen | 701/202 |
| 5,925,091 | * | 7/1999 | Ando | 701/212 |
| 5,978,724 | * | 11/1999 | Sekine | 701/70 |
| 5,978,730 | * | 11/1999 | Poppen et al. | 701/202 |
| 6,029,112 | * | 2/2000 | Nam et al. | 701/209 |

FOREIGN PATENT DOCUMENTS 195 08 486 A1 9/1996 (DE) ................................ G07C/5/08

* cited by examiner

*Primary Examiner*—William A. Cuchlinski, Jr.
*Assistant Examiner*—Ronnie Mancho
(74) *Attorney, Agent, or Firm*—Cohen, Pontani, Lieberman & Pavane

(57) ABSTRACT

A process for analyzing a traffic network uses a source file including edges and nodes representing the traffic network. The process generates partial routes from the source file, wherein each partial route comprises at least one edge and at least one of the partial routes comprises a plurality of adjoining ones of said edges. Route data can be transmitted between a vehicle and a traffic center by designating the partial route instead of each individual edge, thereby optimizing transmission of data via a transmission channel.

13 Claims, 3 Drawing Sheets

PROCESS AND APPARATUS FOR TRANSMITTING ROUTE INFORMATION AND ANALYZING A TRAFFIC NETWORK IN A VEHICULAR NAVIGATION SYSTEM

BACKGROUND OF THE INVENTION

1. Field of the Invention

The invention relates to a process and an apparatus for transmitting route information and analyzing a traffic network in a vehicular navigation system.

2. Description of the Related Art

The transmission of route information between a vehicle and a traffic center such, for example, as a distance traveled by a vehicle along a route (FCD) from the vehicle to the traffic center or other information which may be associated with a traffic center and related to a determined route (e.g., travel times of vehicles), places a high load on transmission paths because of the high number of vehicles. In particular, the transmission of information generated by many individual vehicles concerning routes travelled and travel times for given routes produces a very large quantity of data to be transmitted, because of the large number of vehicles monitored by the traffic center. Unfortunately, the capacity of the available transmission channels is limited.

SUMMARY OF THE INVENTION

The object of the present invention is to optimize the transmission of route information data between a given vehicle and a traffic center. This object is attained by generating partial routes from a source file which contains digital map information in the form of edges connected by nodes. Each of the partial routes comprises one or more adjoining edges and at least one of the partial routes comprises a plurality of edges. The route data is then generated with designators representing the partial route to which the route data pertains.

The invention optimizes the transmission of route information by reducing redundancy, thereby increasing information density, during transmission. To this end, one or more edges on the digital map of the traffic network in which the vehicles travel are combined to form partial routes. Route information is then transmitted with a designator of the partial route to which the information relates instead of each individual edge of the partial route. Other data, such, for example, as travel times, environmental data, and temperatures are identified by designating the partial route and its location. The exact location to which a particular path related information pertains is designated by the distance from a beginning of a partial route which is a one-dimensional path parameter. The use of a one-dimensional path parameter requires less data transfer than a two-dimensional location specification (geographic longitude and latitude). Moreover, the location designator is relatively short.

Edges on the digital source network map of the traffic network represent segments of streets, roads, road groups on which vehicles are travelling. Edges are connected to other edges by nodes. One, two or more edges can meet at the node of a traffic network. When only one edge is connected at a node, the node represents an end point of the traffic network. When two edges are connected at a node, the node represents the longitudinal division of a street, road, road group into multiple edges, whereby every two edges are connected by a node. When three or more edges meet at a node, the node represents a branching or intersection of streets, roads, road groups. An intersection where more than three edges meet may be replaced by several nodes, each having three edges. Each different direction of travel on a street such as the northbound and the southbound lanes of an interstate highway may be represented by one or more edges. As used herein, route information comprises data that identifies the route travelled by a vehicle so that the edges and/or the partial routes made up of one or more adjoining edges together constitute the travelled route. When the route travelled by a vehicle is found on a digital traffic network map in the traffic center on the basis of transmitted route data, it is then possible to associate other data such as travel times with this route.

The route information may, for example, relate to a route travelled by a vehicle that has a traffic detector, and may be transmitted by the vehicle to the traffic center. Data collected in this fashion at the traffic center may be used, in particular, for travel time statistics and for transmitting recommendations on the choice of routes to other vehicles which follow.

The route information may also comprise, for example, a route recommended by the traffic center to a vehicle and transmitted by the center to that vehicle or multiple vehicles. A vehicle is thus informed of the travel times for one or more possible routes, as determined in a traffic center on the basis of travel time statistics, and advised on the choice of routes.

Advantageously, route information is transmitted to the vehicle by transmitting the designators of the partial routes that make up that route. A route may comprise one or more partial routes. The designators of the partial routes may be stored at the traffic center and in the vehicle in identical or different data bases. The databases associate the partial routes with the edges that make the partial routes. Instead of directly associating edges with partial routes, a set of rules for creating partial routes from edges may be stored at the traffic center and in the vehicle, and used to identify the partial routes of a route to be transmitted. Moreover, several different data bases and/or sets of rules for creating partial routes may be stored in the vehicle and at the traffic center. When data relating to a route are transmitted, the set of rules or data base to which these data relate is then transmitted as well, which increases the universality of the system.

Furthermore, the edges may be combined into partial routes depending on a type of road they represent. For example, partial routes may be composed of edges that represent interstate highway segments, or of edges that represent interstate highway segments and secondary roads.

Advantageously, the expected travel time for a recommended route is transmitted from the traffic center to at least one vehicle, and the actual time needed to travel a given route (or the partial routes thereof) is transmitted from a vehicle to the center. Thus, times for particular routes can be determined directly, going beyond statistics on the levels of traffic on given segments of the road.

Preferably, the time period or timepoint associated with the transmitted route information is transmitted along with the information. Thus, either the exact time or a quantified time period of transmission is transmitted with the route information by a vehicle and stored at the traffic center. In addition, the traffic center, when transmitting route information, may also transmit the time period to which this information refers such, for example, as the time of day, day of the week or day of the year. In this way, precise route recommendations may be sent, for example, in view of traffic congestion that occurs at particular times of the day, days of the week, or times of the year.

A target file is generated by the process for analyzing a traffic network composed of edges and nodes that is suitable for referencing partial routes during the transmission of route data between a traffic center and a vehicle. To generate the target file, various procedures may be used. For example, partial routes can be defined as follows: Starting from a node selected as the starting node of the network, each of the partial routes, which are numbered in ascending order, is defined by turning left as long as possible from one starting node to another. This rule can be very simply implemented.

A process according to the invention can be advantageously implemented in a traffic center or user device in the form of a software program.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawing, wherein like reference characters denote similar elements throughout the several views.

DETAILED DESCRIPTION OF THE PRESENTLY PREFERRED EMBODIMENTS

Figure 1:
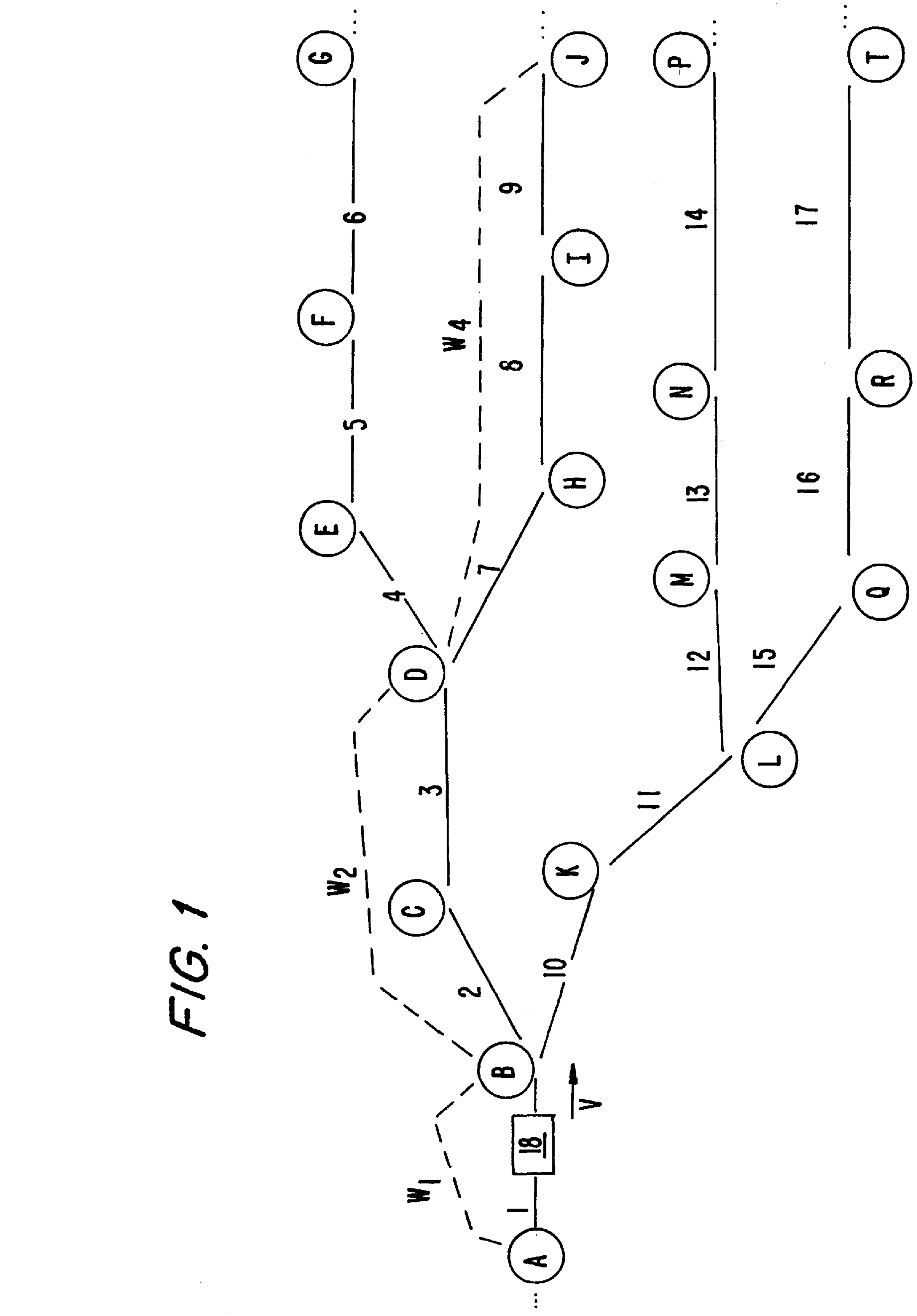
FIG. 1 is a schematic depiction of a digital road map of a traffic network showing partial routes $W_1$–$W_4$ according to an embodiment of the invention.

FIG. 1 shows a digital road map of a traffic network, which comprises edges 1 to 17 and nodes A to T. Each edge represents a segment of a road. Instead of representing one segment of a road, several edges may be used to define one segment of a road such, for example, as two different edges representing two traffic directions, or one edge representing each lane of traffic, or using an additional edge to represent turn lanes. In FIG. 1, each edge is located between two nodes. For example, edge 1 is located between nodes A and B, edge 2 is located between nodes B and C, and edge 3 is located between nodes C and D. FIG. 1 depicts a very small traffic network. Each of the nodes A, G, J, P, T constitutes a starting node of the digital map of the traffic network. Starting node are connected to only one edge (or only one edge of a given road class in the traffic network). Nodes B, D, L are branching nodes. Branching node are connected to at least three edges. This means, for example, that a vehicle at node B can travel from edge 1 toward either edge 2 or edge 10. In other words, a genuine branching possibility exists at each branching node. Instead of being connected to three edges, as shown here, a branching node may also be connected to more than three edges, such, for example, as at an intersection. At intersections comprising more than three edges, several branching nodes may be defined, from each of which just three edges start. In this way, all branching nodes may comprise exactly three edges. Nodes C, E, F, H, I, K, M, N, Q, R are nodes from which only two edges start. For example, edges 2 and 3 start from node C. Although nodes and edges of this type may be important in digital traffic network maps used for specific purposes such, for example, as detecting traffic jams, these types of nodes and edges are not important for route analysis or the transmission of related route information including travel times.

When using a "source file" which comprises a digital map that represents a traffic network such as the map shown in FIG. 1, a "target file" may be generated that, using edges and/or nodes, depicts partial routes of the traffic network with low redundancy. For example, instead of three adjoining edges, the "target file" uses one partial route to depict the path covered by the three edges. When generating the target file, it is possible to consider only a certain road class, such as an interstate highway. It is also possible to generate multiple target files from one source file including, for example, one target file for each type of road class.

To transmit a route and data related thereto using a digital road map like the map depicted in FIG. 1 that represents a traffic network and exists as a source file, the nodes and or edges passed are transmitted from the vehicle to the traffic center. For example, a vehicle 18 traveling on edge 1 in the direction of arrow V from starting node A to starting node J can travel via the edges 1, 2, 3, 7, 8, 9. This route may be recorded in a user device in the vehicle on the basis of a location-finding system such as a Global Positioning System (GPS), an odometer, a speedometer, the detected steering movements of the vehicle, and/or a digital road map. It is also possible to determine the total time needed for a given route and the partial route times needed for partial routes thereof. This route information is then transmitted from the vehicle 18 to the traffic center by a communication mechanism such, for example as, a radio and particularly a mobile phone. Transmission in the form of a brief message using the GSM, particularly the SSM-SMS protocol, may, for example, be selected for this purpose.

In the example shown in FIG. 1, which relates to a route from A to J travelled by the vehicle 18, the edges 1, 2, 3, 7, 8 and 9 and the times needed for traveling through these edges may be transmitted as route information to a traffic center. However, given the large number of vehicles, an enormous amount of data to be transmitted accrues, while the capacity of the available transmission medium is limited. Therefore, the amount of accruing data must be kept as small as possible.

To this end, partial routes are generated from the traffic network. A partial route may comprise one or more of the edges 1 to 17. Stored in the user device and at the traffic center is either at least one set of rules for creating partial routes in a traffic network, or a target file which is a less redundant (IT compressed) digital road map of the traffic network generated according to a set of rules from the digital road map source file of a traffic network. If several sets of rules for creating partial routes or several target files created according to these rule sets exist in the vehicle and at the traffic center, the applicable rule set and/or target file may be transmitted to identify the route along with the data to be transmitted. The data to be transmitted may comprise the travelled route and the travel times related thereto and may be transmitted from the vehicle to the center or from the center to a vehicle.

The rules for generating partial routes may be independent of the particular digital road maps used in the user device and at the traffic center. Specifically, it is not necessary for the same digital road map (source file) or the same version (update) of a digital road map to exist in the user device and at the traffic center. The process may also be embodied for different maps or map versions in the user device and at the traffic center.

Various sets of rules may be used for reducing the data of a traffic network by creating partial routes from multiple edges and/or nodes. For example, a partial route may be defined between two nodes, which are either starting nodes A, G, J, P, T or branching nodes B, D, L, respectively. In this embodiment, the partial routes of the digital road map of a traffic network shown in FIG. 1 are arrived at as follows:

Partial route $W_1$ comprises edge 1; partial route $W_2$ comprises edges 2, 3; $W_3$=4, 5, 6; $W_4$=7, 8, 9; $W_5$=10, 11; $W_6$=12, 13, 14; $W_7$=15, 16, 17. The set of rules for creating the partial routes $W_1$ to $W_7$ may be stored at the traffic center and/or at the vehicle. The edges contained in the respective partial routes $W_1$ to $W_7$ and/or the nodes constituting the ends of the partial routes $W_1$ to $W_7$ may also be stored in a target file.

Another example of a set of rules for creating partial routes on a digital road map representing a traffic network may comprise the following instructions: A partial route is created by starting from any starting node such, for example, as A and turning left as long as possible until another starting node G, J, P, or T is reached. Then other partial routes are created by starting from starting node A to the other starting nodes until partial routes are created for connecting starting node A to all the other starting nodes. In this way, routes between starting node A and the other starting nodes are determined. Another rule may call for the selection, after all possible routes from starting node A have been realized, of another starting node G, from which all routes, except the route to the already considered starting node A, are correspondingly defined as partial routes. A further rule can specify that, after this, the remaining nodes are proceeded with accordingly. This process would result in the creation of the following partial routes: $X_1$ for the route from node A to node G; $X_2$=A, J; $X_3$=A, P; $X_4$=A, T; $X_5$=G, J; $X_6$=G, P; $X_7$=G, T; $X_8$=J, P; $X_9$=J, T; $X_{10}$=P, T. The number of partial routes $X_1$ to $X_{10}$ is the factorial number of the starting nodes. In this embodiment, each route would contain only one partial route as transmitted route information.

A further set of rules for creating partial routes may be defined according to the following instructions: From any desired starting node such, for example, as A, generation of a partial route is conducted by turning left as long as possible, up to another starting node G, J, P, T. Partial routes are thereby defined only for routes between one starting node and another starting node. If traffic data from vehicles indicate that a relevant number of vehicles are travelling between a starting node and an intersection node, another partial route may be generated for that section of the traffic network. Thus, only several routes in the traffic network are arrived at, each of which contains only one or more defined partial routes so that the transmission of related route information is optimized for these several routes. However, because a large proportion of vehicles travelling in the traffic network travel on routes made up of partial routes which reduce redundancy, good optimization of the amount of data accruing during the transmission of route information from vehicles is attained.

Figure 2:
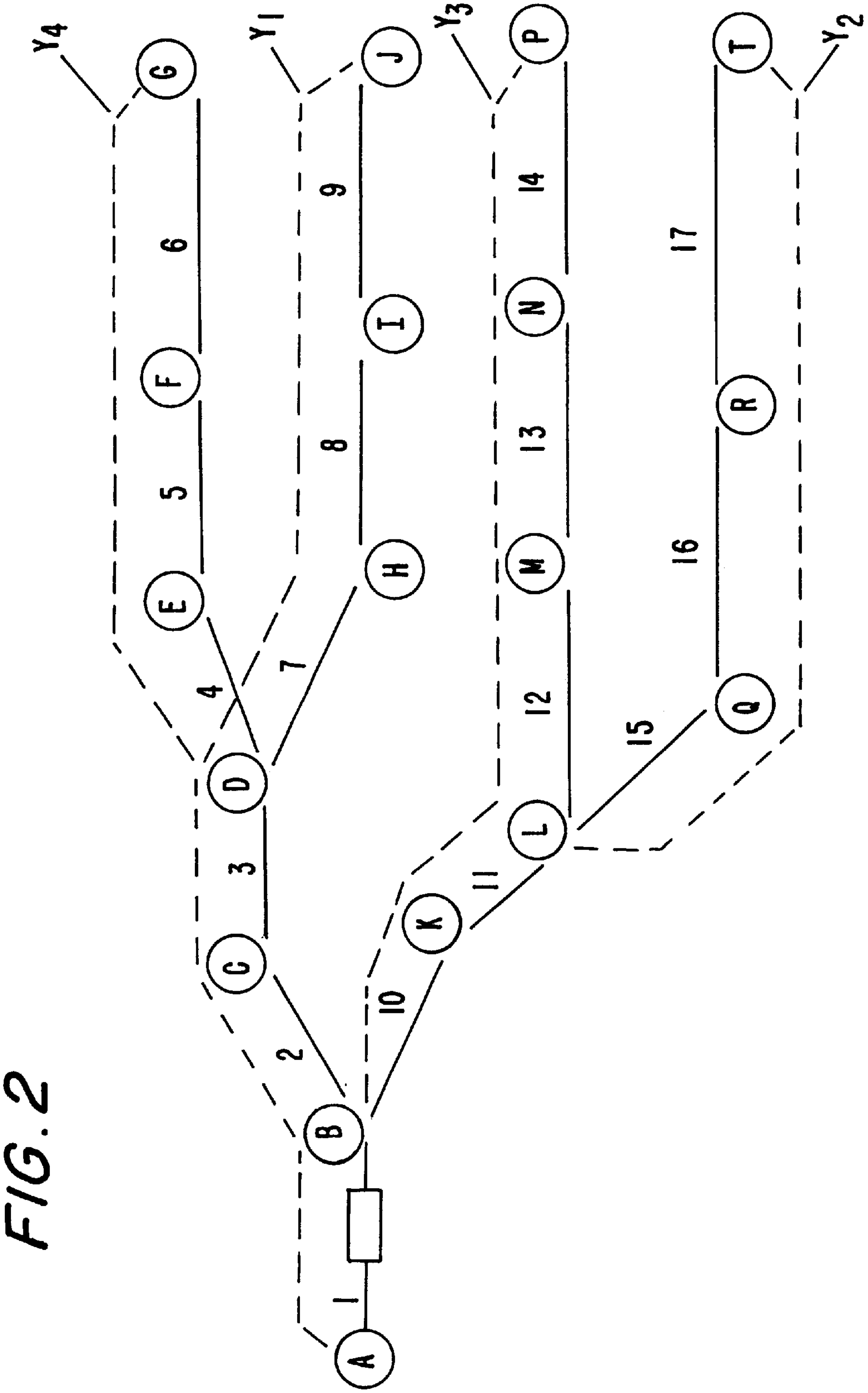
FIG. 2 is a schematic depiction of a digital road map of a traffic network showing partial routes $Y_1$–$Y_4$ according to an embodiment of the invention.

Referring to FIG. 2, another set of rules for creating partial routes may, for example, comprise the following instructions: The first partial route $Y_1$ comprises edges 1, 2, 3, 7, 8 and 9. Partial route $Y_2$ comprises edges 15, 16 and 17. Partial route $Y_3$ comprises edges 10, 11, 12, 13 and 14. Partial route $Y_4$ comprises edges 4, 5 and 6. Thus, all routes that can be travelled by a vehicle 18 starting at starting node A are defined and transmitted with very low data quantity. According to this set of rules, routes between node C and node D, for example, cannot be transmitted with low redundancy in the form of partial routes. However, this is not a problem if few vehicles travel from C to D.

Figure 3:
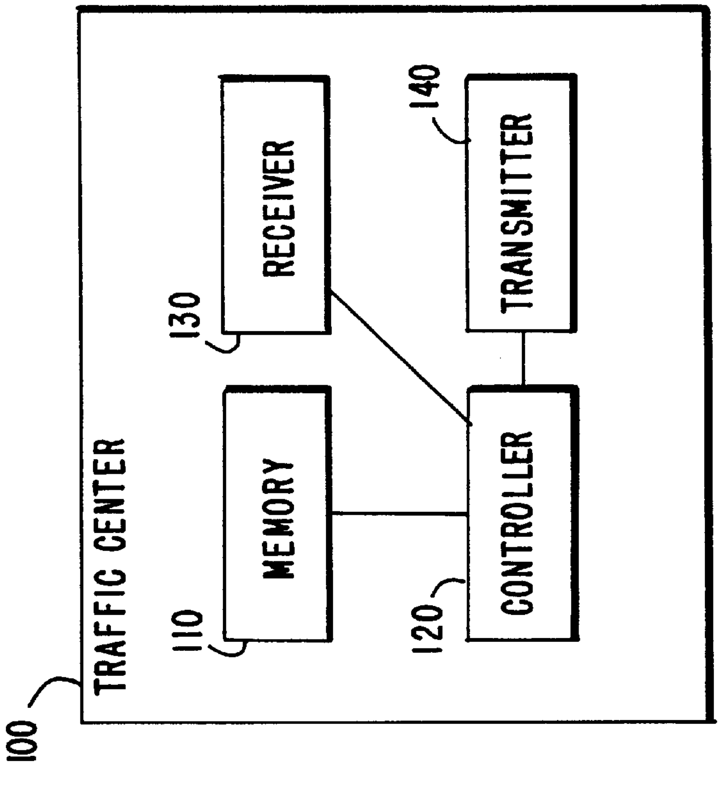
FIG. 3 is a block diagram of a traffic center according to an embodiment of the present invention.
Figure 4:
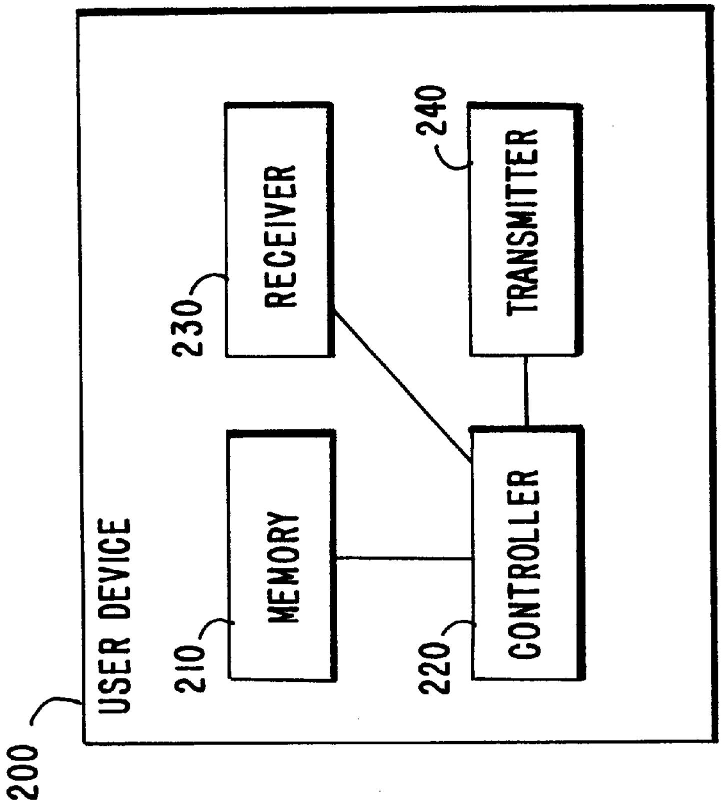
FIG. 4 is a block diagram of a user device according to an embodiment of the present invention.

FIGS. 3 and 4 show the traffic center 100 and the user device 200 for implementing the inventive process. The traffic center 100 includes a memory 110 for storing a source file, a target file, or a set of rules for generating partial routes. The traffic center 100 also has a receiver 130 and a transmitter 140 for receiving route data from the user device 200 in the vehicle and transmitting route data to the user device 200. A controller 120 is connected to strike the memory 110, receiver 130, and transmitter 140 for implementing the inventive procedure. The user device also includes a memory 210 for storing the source file, a target file, or a set of rules for generating partial routes, a receiver 230 and a transmitter 240 for receiving route data from the traffic center 100 and transmitting route data to the traffic center 100. A controller 220 is connected strike the memory 210, receiver 230, and transmitter 240 for implementing the inventive procedure.

The invention is not limited by the embodiments described above which are presented as examples only but can be modified in various ways within the scope of protection defined by the appended patent claims.

I claim:

1. A process for transmitting route data between a vehicle and a traffic center related to a route being traveled by the vehicle using a digital source map of a traffic network including edges connected by nodes representing the traffic network, the process comprising the steps of:

storing a plurality of sets of rules for creating partial routes from the source map of the traffic network in a memory of the traffic center and in a memory of the vehicle;

generating partial routes from the source map and respectively designating the partial routes with designators in accordance with a selected set of rules from the plural sets of rules, wherein each said partial route comprises at least one edge and at least one of said partial routes comprises a plurality of adjoining ones of said edges; and transmitting the route data between the traffic center and the vehicle by transmitting the designators representing the applicable partial routes that constitute the route being traveled by the vehicle, thereby optimizing an amount of route data to be transmitted via a transmission medium for the route being traveled by the vehicle, and transmitting one of the selected set of rules and a designator of the selected set of rules with the route data.

2. The process of claim 1, wherein said step of transmitting comprises transmitting the route data from the vehicle to the traffic center.

3. The process of claim 1, wherein said step of transmitting comprises transmitting the route data from the traffic center to the vehicle.

4. The process of claim 1, further comprising the step of storing the designators of the partial routes in a memory of the traffic center and in a memory in the vehicle.

5. The process of claim 4, wherein said step of storing comprises storing said designators in the form of target files in which the edges that form one partial route are associated with the respective designator of the one partial route.

6. The process of claim 1, wherein said step of generating partial routes comprises generating a partial route between a node from which at least three edges are connected and another node from which at least three edges are connected.

7. The process of claim 1, wherein said step of generating partial routes comprises taking into account a type of road represented by the edges.

8. The process of claim 7, wherein said step of generating partial routes comprises generating partial routes from edges of the same type of road.

9. The process of claim 1, wherein said step of transmitting the route data comprises transmitting a travel time expected for a given route from the traffic center to a vehicle.

10. The process of claim 1, wherein said step of transmitting the route data comprises transmitting a travel time needed for one of the route and a partial route travelled by the vehicle from the vehicle to the traffic center.

11. The process of claim 1, wherein said step of transmitting further comprises transmitting one of a time period or a time point at which the route data was determined.

12. The process of claim 1, further comprising a step of storing route data collected from a plurality of vehicles for a plurality of partial routes in a statistical file in a memory of the traffic center.

13. The process of claim 12, wherein said step of storing route data comprises storing associated travel times and one of associated collection time periods and collection time points.

* * * * *